United States Patent
Kuehn, Jr.

[11] 3,904,718
[45] Sept. 9, 1975

[54] COUNTERSINK SEALANT APPLICATION METHOD

[75] Inventor: Riley Kuehn, Jr., Auburn, Wash.

[73] Assignee: The Boeing Company, Seattle, Wash.

[22] Filed: Sept. 3, 1974

[21] Appl. No.: 502,720

[52] U.S. Cl. ............... 264/39; 117/95; 117/127; 118/203; 118/254; 118/261; 118/263; 156/235; 156/540; 264/267; 264/310; 264/312; 425/113
[51] Int. Cl.² ......................................... B29C 5/04
[58] Field of Search ............. 264/39, 259, 267, 310, 264/312; 156/230, 231, 232, 235, 238, 244, 246, 249, 293, 540; 118/215, 203, 241, 243, 254, 261, 263; 425/113, 287, 288; 117/95, 127; 401/10

[56] References Cited
UNITED STATES PATENTS
3,796,783   3/1974   Greever ..................... 264/269

Primary Examiner—Robert F. White
Assistant Examiner—Willard E. Hoag
Attorney, Agent, or Firm—Christensen, O'Connor, Garrison & Havelka

[57] ABSTRACT

Transfer of sealant material from a supply source to an aperture in a workpiece is effected by use of a mechanism which has a tip or probe insertable into a first position in which the tip is cleaned and a bead of sealant material applied to sealant receiving means, and is then movable to a second position in which the tip or probe is inserted into the aperture or into engagement with the workpiece surface and the sealant transferred to the aperture or surface. The formation of a bead of the desired shape is effected by rotation of the sealant probe or tip during withdrawal from engagement with the workpiece.

5 Claims, 15 Drawing Figures

3,904,718

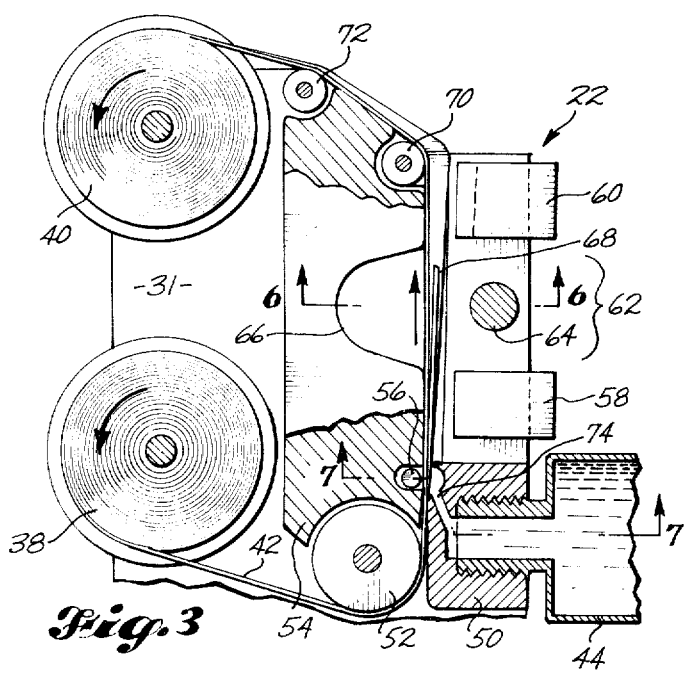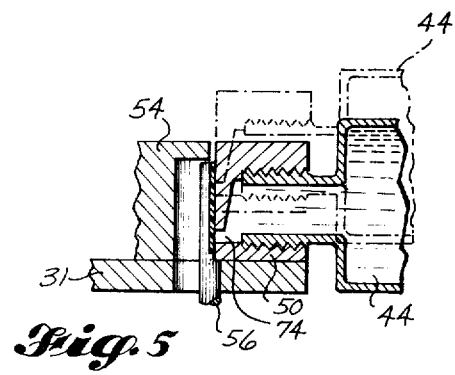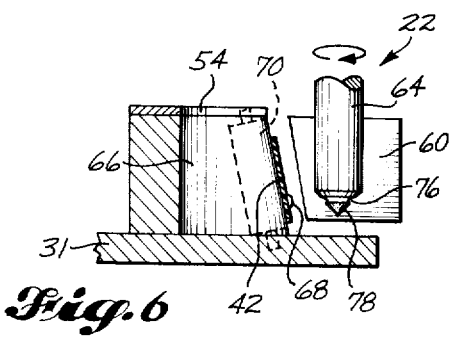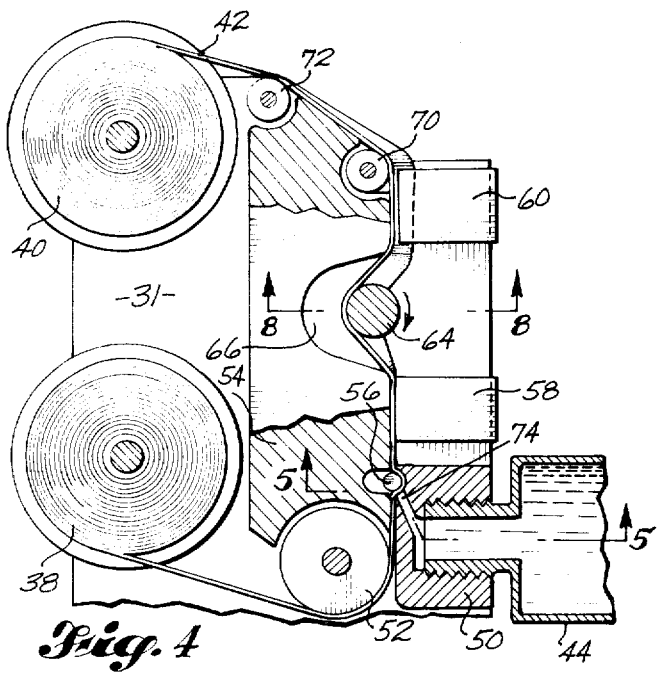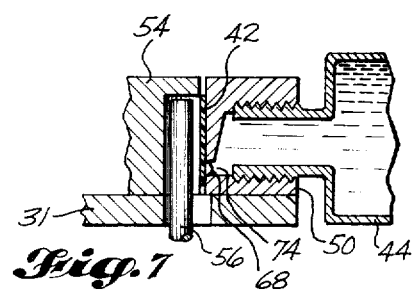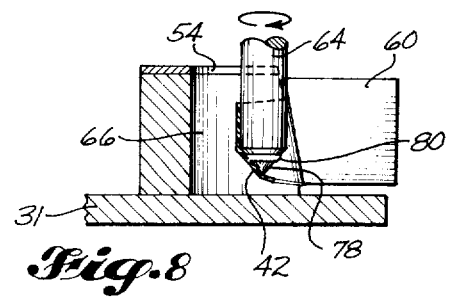

COUNTERSINK SEALANT APPLICATION METHOD

FIELD OF THE INVENTION

This invention relates to a method for emplacing a bead of sealant material upon a workpiece and especially within a bore or countersink in the workpiece.

PRIOR ART

The aircraft industry uses primers and sealants as protection for the rivet--skin interface in riveted structures such as aircraft wings and aircraft fuselages. The checking of paints on the surface of the composite structure and/or working of joints permits corrosive materials in the atmosphere to be drawn into and attack the rivet or skin material adjacent the rivet, occasionally resulting in failure of the structure. In many structures in which the rivets are inserted by hand, a manual sealant gun is utilized to extrude sealant over the rivet heads and on hidden surfaces. With automated equipment, it is necessary to apply sealant material during the riveting cycle, that is, after hole drilling and countersinking, but before rivet insertion in order to maintain adequate riveting rates with the necessary quality control to form adequate joints. The prior art methods of applying sealant on automatic riveters generally results in excess sealant being applied which frequently results in massive workpiece cleanup and excessive time and effort necessary to clean the riveter tooling. Only small quantities of sealant are necessary for each rivet hole and the known devices in the prior art cannot effectively apply the small quantities necessary to the proper location in the countersunk area of the workpiece. In addition, the prior art devices result in misapplication and "stringing" of the sealant. For example, one prior art device utilizes a hollow arm carrying a nozzle means positioned directly over the workpiece. The sealant is extruded through the nozzle with the volume being controlled by time duration or by a metering pump. The material used is extremely tacky so even if volume control was perfect the amount of material that remains on the part can vary. Therefore, to insure an adequate quantity remains on the workpiece, an excess must be applied. The tackiness also results in stringing which precludes even distribution of the sealant material. The sealant remaining on the nozzle element will build up and thus further complicate volume and application control. Other prior art devices utilize spraying techniques and daubers, all requiring cleanup after riveting. For these reasons, the current devices and methods are not satisfactory.

OBJECTS OF THE INVENTION

It is one object of this invention to provide apparatus for precise emplacement of a bead of sealant material on a workpiece surface.

A second object of this invention is to provide method and means for applying a bead of sealant material to an aperture or bore in a workpiece, especially in preparation for a riveting operation.

It is another object of this invention to provide apparatus for applying sealant to a workpiece with a minimum of waste.

It is still another object of this invention to provide a method and apparatus for applying a bead of sealant to a workpiece which minimizes stringing of the sealant. A related object of this invention is to provide a device for applying a bead of sealant which is self-cleaning.

A further objective of this invention is to provide apparatus and method for applying sealant to a workpiece in an even distribution across the intended area.

SUMMARY OF THE INVENTION

These and other objects of the invention are accomplished by a sealant application device which includes an applicator tip, preferably rotatable, having sealant receiving means thereon operated in conjunction with an offset sealant transfer mechanism. The offset sealant transfer mechanism prepares a supply of sealant on a transfer surface in a form suitable for pickup by the tip in a desired configuration. The tip is caused to engage the sealant preparation surface and is moved in engagement with said surface whereby sealant is picked up in the sealant receiving area of the tip and excess sealant remaining from a previous cycle removed. Sealant pickup and conformation on the tip may be enhanced by movement of the sealant preparation surface substantially perpendicular to the axis of the tip during sealant pickup. Concurrently with sealant pickup, the sealant preparation surface cleans and trims the tip of excess sealant to control buildup of the sealant on the tip. The prepared tip, carrying the desired amount of sealant, is then placed into contact or near contact with a workpiece whereby the sealant carried by the tip contacts and is deposited upon the workpiece. Concurrently with contact of the sealant with the workpiece, the tip may be rotated to evenly distribute and deposit sealant on the workpiece aperture. The tip is withdrawn, preferably while being rotated, leaving a bead of sealant material at the proper location in the aperture without stringing the sealant upon adjacent workpiece areas.

BRIEF DESCRIPTION OF THE DRAWINGS

The above objectives and attributes of this invention will become more readily apparent through a reading of the following detailed description and an examination of the appended drawings wherein:

FIG. 3 is a plan view partly in section of a sealant applicator apparatus with the tip of the sealant applicator apparatus positioned adjacent the sealant supply mechanism.

FIG. 4 is the apparatus shown in FIG. 3 wherein the sealant tip is in contact with the sealant supply.

FIG. 5 is a cross section of the sealant supply means taken along lines 5—5 of FIG. 4.

FIG. 6 is a cross-sectional view of the sealant tip taken along lines 6—6 of FIG. 3.

FIG. 7 is a cross-sectional view of the sealant supply taken along lines 7—7 of FIG. 3.

FIG. 8 is a cross-sectional view of the sealant tip taken along lines 8—8 of FIG. 4.

DETAILED DESCRIPTION OF THE PREFERRED EMBODIMENT

Figure 1:
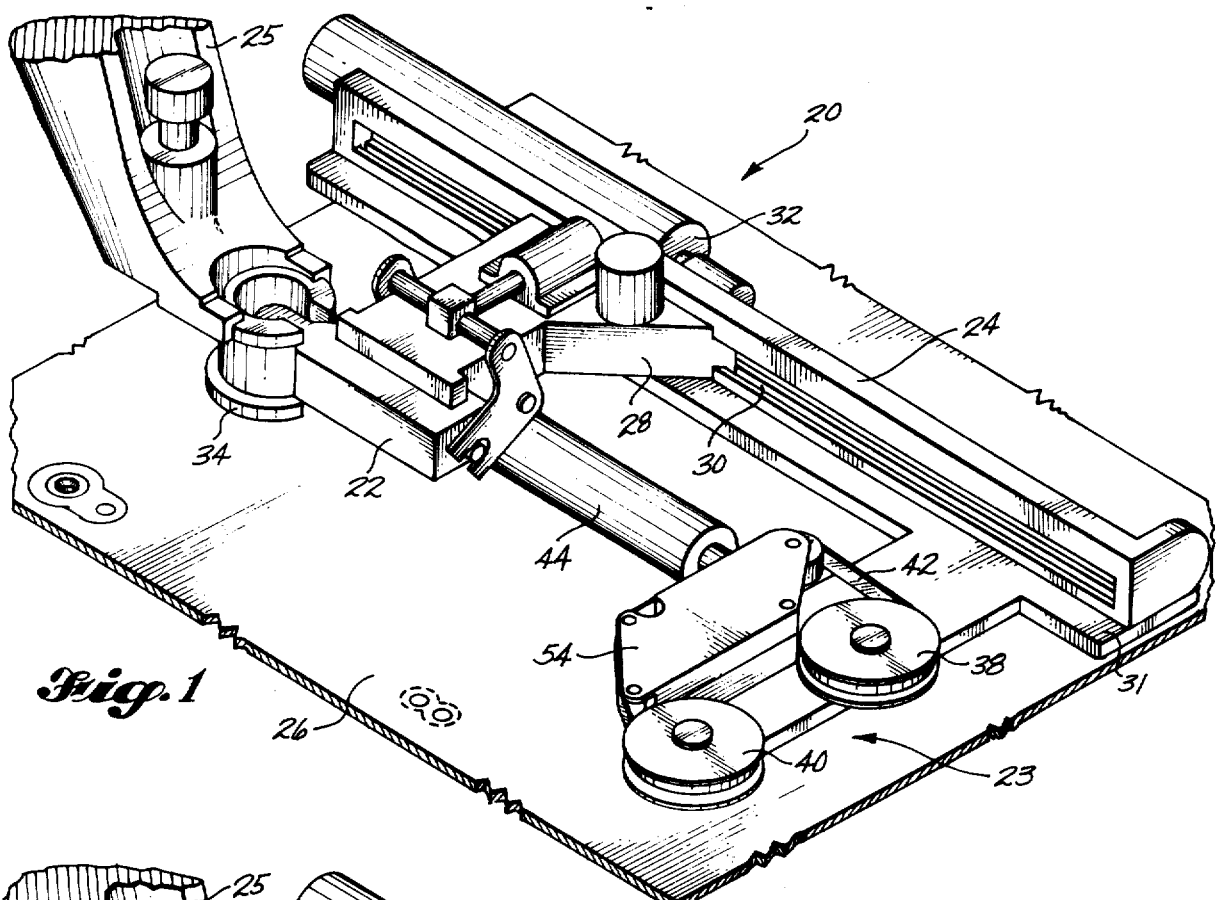
FIG. 1 is a perspective view of a sealant applicator embodying the subject invention.
Figure 2:
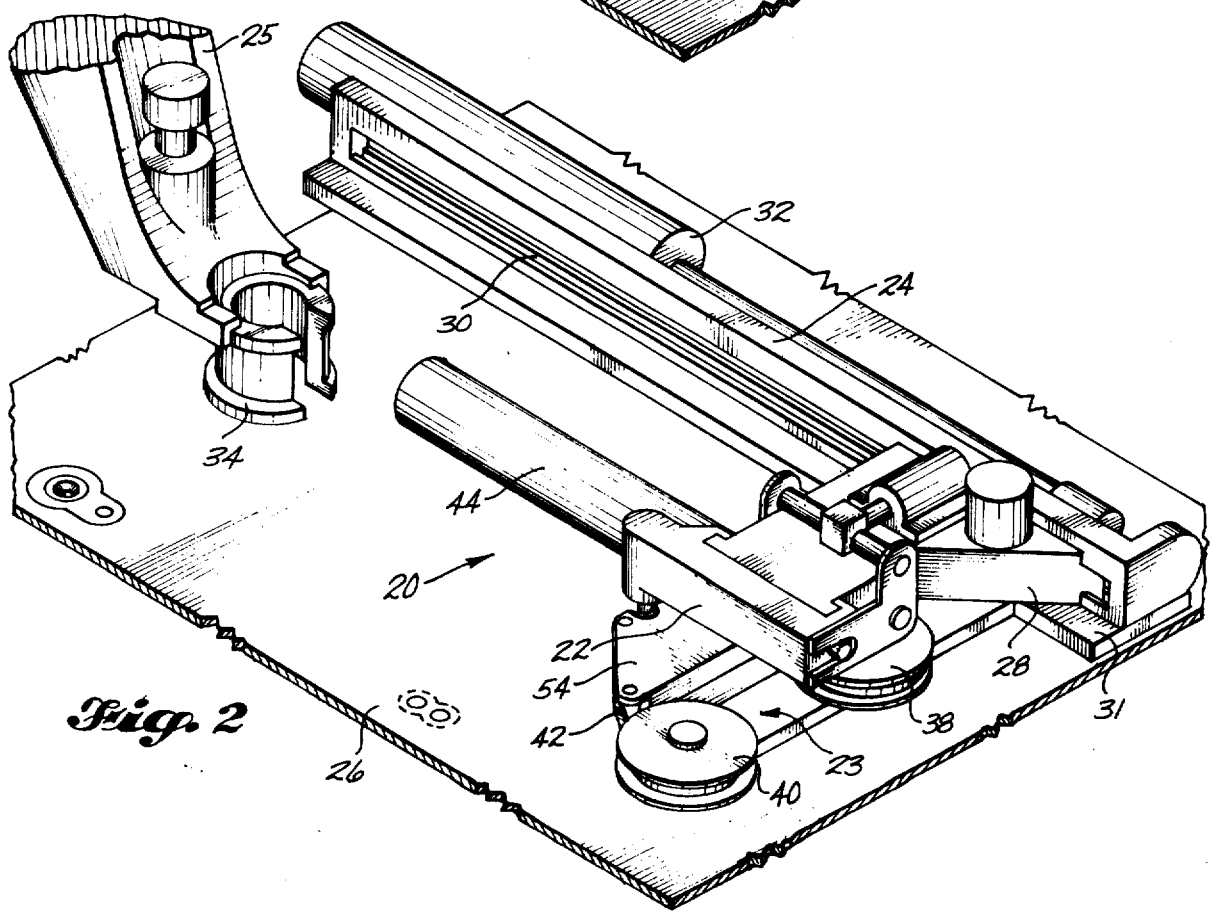
FIG. 2 is a perspective view of a sealant applicator device extended into contact with a sealant supply mechanism.

Referring particularly to the drawings, wherein like numerals indicate like parts, there is seen in FIG. 1 a sealant application device comprised of two basic units, namely the applicator head 22 and the sealant transfer mechanism shown generally at 23. The applicator head and sealant transfer means are positioned on a frame 24. Pressure foot 25 carrying pressure foot bushing 34 is utilized to hold the workpiece firmly in position whenever applying sealant as well as during the various riveting functions of drilling, countersinking, sealant application, rivet insertion and rivet fastening. Applicator head 22 is reciprocatively mounted on frame 24 for travel from a sealant application position as shown in FIG. 1 to a sealant pickup position as shown in FIG. 2. Frame 24 includes guide 30 which engages reciprocating carriage 28 for movement of the applicator head to the desired location. The movement is induced by piston 32.

The offset sealant transfer apparatus includes the offset sealant transfer block 54 with its associated tape feed roll 38 and tape takeup roll 40. A flexible tape 42 is fed to the apparatus from tape feed roll 38 and is removed from the apparatus on the tape takeup roll 40. A sealant supply cartridge 44 is shown positioned adjacent the offset sealant transfer block 54 in engagement with orifice block 50. These features are best seen in FIGS. 3-8.

Orifice block 50 directs the flow of sealant material from cartridge 44 into a position adjacent the tape 42 and for direct application to tape 42 whenever the metering pin 56 is in the position shown in FIG. 4. The flow of sealant material is cut off by movement of the metering pin 56 into engagement with the metering orifice 74 as shown in FIG. 3. Sealant is displaced from the cartridge 44 by air pressure which may advantageously be pulsed for each sealant application cycle. If low pressures are used with sealant materials having a suitable viscosity, the metering pin 56 may not be necessary as the flow of sealant would be controlled satisfactorily by control of and pulsing of pressure supplied to cartridge 44.

As noted above, the flexible tape 42 is fed from tape feed roll 35 around tape feed idler 52 past the metering orifice 74 to the recess 66. The tape then continues around inclined idler 70 to tape takeup idler 72 and then to the tape takeup roll 40. A bead of sealant 68 is deposited upon the surface of the tape by means of the metering orifice 74 in a location available for engagement by the sealant applicator tip 64. The location of the bead is best seen in FIGS. 3, 5 and 6. The sealant applicator tip 64 has a groove 76 on the conical land 78 thereof which is adapted to receive sealant material from tape 42. Sealant applicator tip 64 is further adapted for rotation by means (not shown) in applicator head 22.

The apparatus as shown in FIGS. 3 and 6 has applicator head 22 positioned adjacent the tape 42 with a bead of sealant material 68 positioned upon the outer exposed surface of tape 42. The bead has been prepared by drawing tape 42 past orifice 74 with pin 56 in its retracted position as shown in FIG. 3. The pin 56 is then moved to its position as shown in FIG. 4 to stem the flow of sealant and hold the tape in engagement with the orifice 74.

The sealant applicator tip 64 is then moved into contact with the tape as shown in FIGS. 4 and 8 in order to dress the unused sealant (if any) remaining from the prior sealant application cycle from tip land 78 and to pick up a new bead of sealant material 80 from the tape 42 in preparation for depositing the sealant material in a countersink in a workpiece. Thus, the sealant transfer mechanism performs both the functions of cleaning and preparing the tip for a new cycle of usage as well as applying the correct amount of sealant material to the groove 76 of the applicator tip 64. These functions are enhanced by motion of the tape past the tip.

FIG. 5 shows a cross-sectional view taken along lines 5—5 of FIG. 4 showing the metering pin 56 occluding orifice 74 to prevent further flow of sealant material from sealant supply cylinder 44. In this view, the tape 42 is shown wrapped partially around metering pin 56 and into engagement with the orifice to prevent flow.

FIG. 7 shows the cross-sectional view taken along lines 7—7 of FIG. 3 in which metering pin 56 has been retracted permitting flow of sealant material in a bead 68 from sealant cylinder 44. Tape 42 is advanced whenever the pin 56 is retracted so that a bead of the desired dimensions is formed thereon.

Figure 9:
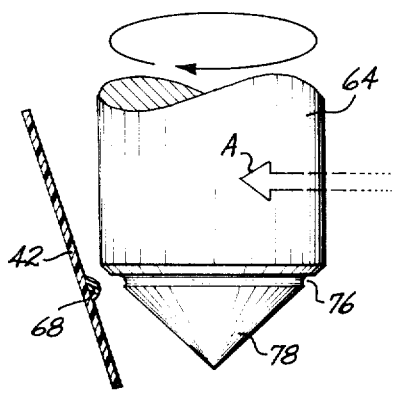
FIG. 9 is a schematic representation of a side elevational view of the tip positioned adjacent the sealant bearing tape.
Figure 10:
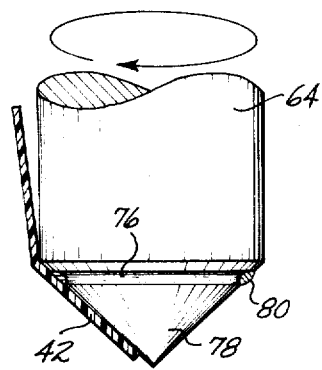
FIG. 10 is a side elevational view of the tip shown in engagement with the tape receiving sealant.
Figure 11:
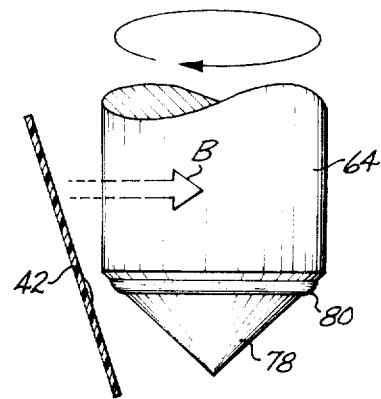
FIG. 11 is a side elevational view of the tip bearing the sealant being moved away from the sealant tape.

In FIG. 6, which is a cross-sectional view taken along line 6—6 of FIG. 3, sealant applicator tip 64 is shown positioned adjacent paper tape 42 which is angled by the orientation of inclined idler 70. A bead of sealant material 68 is shown in position ready to be applied to the groove 76 of land 78. Recess 66 permits tip 64 to engage tape 42 and push tape 42 back into the recess in order to provide positive contact with the tape by tip 64. FIG. 8 shows tip 64 forced against tape 42 whereby rotation of tip 64 prepares the tip by cleaning any excess sealant material therefrom, and places a bead 80 of sealant material into groove 76 for application in the next cycle. FIGS. 9, 10, and 11 show the tip cleaning and sealant pickup steps in detail.

Figure 12:
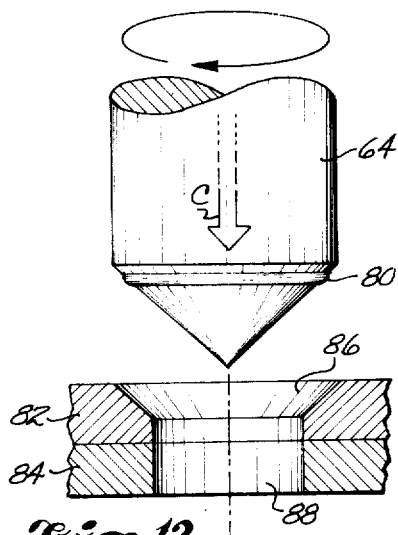
FIG. 12 is a side elevational view of the sealant application tip positioned above an aperture in a workpiece.

When the tip is prepared for usage, it is retracted from engagement with tape 42 and the entire applicator head 22 is moved into the position shown in FIG. 1 in preparation for application of the sealant material to a suitable orifice in a workpiece. FIGS. 12-15 show a schematic representation of the application of the sealant material to a workpiece. In FIG. 12 there is seen an upper workpiece 82 and a lower workpiece 84 having an aperture 88 therethrough, the upper workpiece 82 having a countersink 86 therein. The workpieces are prepared for fastening together by riveting. Throughout the application cycle, tip 64 is preferably rotated both during preparation and during application in order to both receive and apply the sealant in the most advantageous manner.

Figure 13:
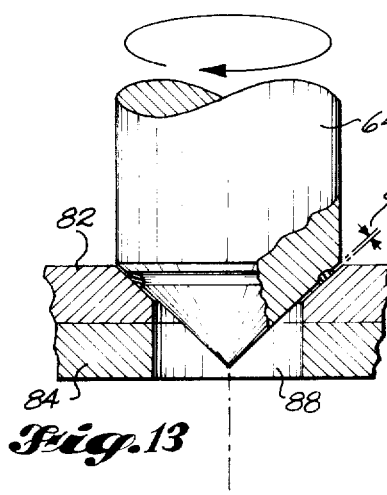
FIG. 13 is a side elevational view of the sealant application tip engaging the workpiece and depositing sealant thereon.
Figure 14:
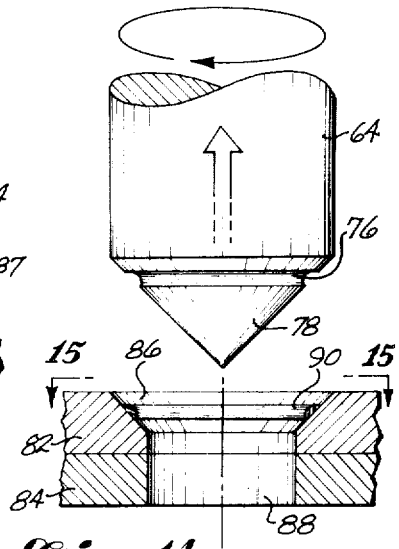
FIG. 14 is a side elevational view of the sealant application tip leaving the workpiece with the sealant shown positioned on the workpiece.
Figure 15:
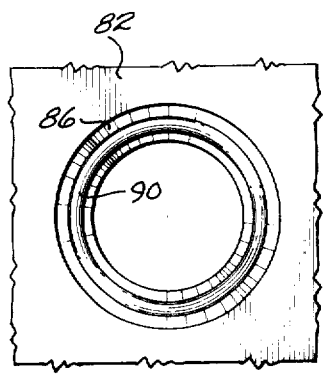
FIG. 15 is a plan view of the aperture shown in FIG. 14 having sealant therein.

In FIG. 13 the tip 64 is shown extended into the countersink 86 with bead 80 being applied directly to the countersink 86 by virtue of the rotation of the tip 64 the sealant material wets and is applied as a bead to the prescribed area of the countersink to which the sealant is to be applied. A slight gap 87 may be maintained between land 78 of tip 64 and the countersink so that the bead may best be dressed to the desired configuration; however the inventor's presently preferred embodiment has at least a portion of land 78 in contact with the countersink surface 86. Thus tip 64 "bottoms out" in the countersink thus requiring no mechanical stop to create and control the size of the gap 87. The configuration of tip 64 and transfer block 54 may be altered to modify sealant bead location and size. Tip 64 is then withdrawn, as shown in FIG. 14, leaving a bead 90 of sealant material positioned on the interior of countersink 86. Continued rotation of tip 64 prevents stringing and undesired removal of the sealant bead 90 from countersink 86. In actual practice it has been found that a portion of the sealant remains on tip 64, largely within groove 76. The amount remaining on the groove has been found to be essentially constant within a broad range of sealant quantity on the tip and is substantially controlled by tip configuration. In FIG. 15 a plan view of the countersink area 86 with sealant bead 90 thereon is shown. Countersink 86 is thus prepared to receive the shoulder of a rivet and provide a proper seal at the rivet without excessive sealant material spread on the workpiece.

It will be appreciated by those skilled in the art that an improved applicator device for sealant material and an improved method for emplacement of sealant material upon a workpiece achieving the above-mentioned and related objectives may be embodied in variant forms within the framework of the inventive concept. For example, modification of the configuration of the applicator tip permits emplacement of sealant on a flat surface such as a counterbore or the outer surface of a straight bore whereby the head of a bolt or rivet could be effectively sealed to the workpiece surface. Various tips of other than conical configuration could thus be advantageously used for these and other more specialized applications with various workpiece configurations. However, the illustrated embodiment is considered to be of optimum form and design so as to achieve these various objectives in a degree which is unique. Thus, the invention broadly embraces the concept of mounting a rotatable sealant applicator tip within a framework which is movable from a first sealant receiving and tip dressing position to a second sealant application position in which the sealant is transferred from the tip to a workpiece. A flexible sealant carrying means is utilized as both the transfer mechanism for applying sealant to the applicator tip and as the means for dressing and cleaning the tip to remove any sealant material remaining from the previous sealant application step. It is understood that a plurality of such sealant applicator tips may be present in the device so that sealant may be applied in a plurality of locations to the workpiece. It is similarly to be understood that automatic operation of the sealant applicator device is contemplated wherein a workpiece is positioned at a sealant receiving station, and a programmed series of processing steps is utilized to first form a bead of sealant material on a transfer medium, then dress the applicator tip to remove leftover sealant, then apply the sealant to a sealant receiving area of the applicator tip, then move the applicator tip to the sealant application station, and then effect transfer of the sealant from the applicator tip to the workpiece. Particular advantage is achieved in this invention by rotation of the tip during both application of the sealant to the applicator tip and during transfer from the applicator tip to the workpiece. It will be recognized that the particular configuration of the sealant transfer means of this invention yields a combination of related advantages unique to this art. These and other aspects of the invention including equivalence thereof will be apparent from an understanding of the subject matter as disclosed and as set forth in the claims which follow.

I claim as my invention:

1. A method for applying sealant material to a workpiece comprising the steps of:
   A. placing an elongated bead of sealant on a flexible strip,
   B. moving said strip in engagement with a rotating applicator tip having an annular recess on a lateral surface thereof to transfer sealant from said strip to said recess and to clean excess sealant from said tip,
   C. contacting said workpiece with said tip to form an annular bead of sealant thereon,
   D. withdrawing said tip from said workpiece, leaving said bead on said workpiece.

2. The method of claim 1, wherein said tip is rotated during withdrawal from said workpiece.

3. The method of claim 1 wherein said sealant material is applied to the interior of an aperture in said workpiece.

4. The method of claim 1 wherein said strip is an elongated tape.

5. The method of claim 1 wherein said flexible strip is moved substantially perpendicular to the axis of said tip during sealant pickup.

* * * * *